US011999611B2

(12) United States Patent
Fenaroli

(10) Patent No.: US 11,999,611 B2
(45) **Date of Patent: *Jun. 4, 2024**

(54) SADDLE AND SADDLE PAD WITH MORPHING INTERFACE

(71) Applicant: Jacqueline Fenaroli, San Jacinto, CA (US)

(72) Inventor: Jacqueline Fenaroli, San Jacinto, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/547,577

(22) Filed: Dec. 10, 2021

(65) Prior Publication Data

US 2022/0106184 A1 Apr. 7, 2022

Related U.S. Application Data

(63) Continuation-in-part of application No. 16/128,577, filed on Sep. 12, 2018, now Pat. No. 11,299,389.

(51) Int. Cl.

*B68C 1/12* (2006.01)
*B68C 1/02* (2006.01)
*B68C 1/04* (2006.01)

(52) U.S. Cl.

CPC ................ *B68C 1/12* (2013.01); *B68C 1/025* (2013.01); *B68C 1/04* (2013.01); *B68C 2001/042* (2013.01)

(58) Field of Classification Search

CPC .. B68C 1/04; B68C 1/025; B68C 1/02; B68C 1/12; B68C 2001/23; B68C 2001/042; B62J 1/00; B62J 1/18; B62J 1/24

USPC ................. 54/44.5, 44.7, 44.3, 65, 66, 41.1; 297/284.3

See application file for complete search history.

(56) References Cited

U.S. PATENT DOCUMENTS

| | | | | | |
|---|---|---|---|---|---|
| 1,982,839 | A | * | 12/1934 | Swanson | B68C 1/04 54/37.1 |
| 2,353,622 | A | * | 7/1944 | Boyle | B68C 1/04 54/44.1 |
| 3,286,440 | A | * | 11/1966 | Walker | B68C 1/02 D30/135 |
| 4,974,397 | A | * | 12/1990 | Ricken | B68C 1/12 54/66 |

FOREIGN PATENT DOCUMENTS

| | | | | | |
|---|---|---|---|---|---|
| DE | 73370 | | * | 7/1893 | |
| GB | 2579852 | A | * | 7/2020 | B68C 1/04 |
| WO | WO-2008030103 | A1 | * | 3/2008 | B68C 1/025 |
| WO | WO-2016083105 | A1 | * | 6/2016 | B68C 1/025 |

* cited by examiner

*Primary Examiner* — Magdalena Topolski
*Assistant Examiner* — Shada Mohamed Alghailani
(74) *Attorney, Agent, or Firm* — Flyer & Flyer, a Professional Law Corp.; David R. Flyer

(57) ABSTRACT

A saddle having a pair of rockrail edges along each lateral side of the saddle, where the rockrail edges serve as fulcrums, that bear on multiple, rigid load bearing arms that teeter totter with the horse in motion, instantly morphing to match the horse's back in order to better distribute the weight of a rider. A saddle pad having multiple, rigid load bearing arms that teeter totter about a fulcrum with a conventional saddle, instantly morphing to the horse's back in order to better distribute the weight of a rider and reduce peak loads.

2 Claims, 12 Drawing Sheets

SADDLE AND SADDLE PAD WITH MORPHING INTERFACE

CROSS-REFERENCE TO RELATED APPLICATIONS

The present application claims priority under 35 U.S.C. 120 and under all applicable U.S. statutes and regulations, to U.S. application Ser. No. 16/128,577, filed Sep. 12, 2018. That U.S. application Ser. No. 16/128,577 previously claimed priority under 35 U.S.C. 119(e) to U.S. Provisional Application Ser. No. 62/557,326 filed Sep. 12, 2017. Those disclosures are incorporated herein by reference in its entirety.

FIELD OF THE INVENTION

A saddle should be comfortable for both horse and rider. The invention relates to distribution of a rider's weight on a horse, where multiple rigid arms are hingedly connected to a saddle at its two lateral edges with the lateral edges referred to as rockrails, and where each rigid arm can seesaw on each rockrail by moving up and down to reshape instantly and match the horse's back shape, and then reshape instantly to match the horse's back when in motion. For enhanced weight distribution, the invention also teaches a saddle pad with the same multiple rigid arms inserted into each side of the saddle pad, which rigid arms can seesaw on a conventional saddle by moving up and down to reshape instantly and match the horse's back shape and then reshape instantly to match the horse's back when in motion.

BACKGROUND OF THE INVENTION

It is accepted that there are meaningful differences between horses in size and shape. It is also accepted that a particular horse's back m ay change shape with movement, weight gain or loss, conditioning, health, training, rider weight and equitation habits.

In the current state of the art, many saddles have rigid frames. A significant disadvantage is that a rigid frame saddle may fit a particular horse poorly and that could create pressure points, where there are areas of concentrated pressure causing chaffing, pain and/or sores to develop on the horse. The goal of fitting a saddle is to ensure the weight of the rider is distributed evenly over the horse's back without causing pressure points.

Attempts to custom fit rigid frames on horses present problems in that the same rigid frame cannot be used for horses of different dimensions without creating pressure points. Another complication with rigid frames is that any rider who rides multiple horses with different shapes and sizes incurs undue expense because he or she would have to acquire multiple saddles.

In the current state of the art, to fit saddles to horses requires expertise, experience and considerable effort. A typical saddle includes a base frame or "tree" with a seat for the rider; on a Western saddle, bars, and on an English saddle, panels, on the bottom of the saddle which protect the horse from the rider's seat and protect the rider's seat from the horse; a girth that fits around the underbelly of the horse and keeps the saddle stable; and stirrups for the rider's feet.

On a typical English saddle, at an interface with the horse, there are panels with cushions that provide a padded surface for the horse's back while raising the tree high enough to clear the horse's spine. On a typical Western saddle, at an interface with the horse, there are bars with pads that provide the same function. These pads help protect the horse's back from the hardness of the saddle and rider's bones while sitting (ischial tuberosity), but they cannot distribute the rider's weight evenly both in motion and at rest, because they lack a morphing structure that can reshape to match the horse it rests upon.

The present invention addresses the absence of a morphing, load bearing structure, by providing a seat with two rockrail edges and hingedly connected arms, replacing the bars of the Western saddle or the panels of the English saddle. The rockrail edge is a fulcrum running roughly parallel to the ground, along two lateral sides of a structure. Multiple rigid arms are hingedly connected to the structure, so they are free to tip about the rockrail, instantly morphing to match the shape of the horse's back in motion, allowing for improved distribution of the load of the rider's weight.

For better weight distribution over a larger surface area at the interface between saddle and horse's back, a saddle pad is inserted with one or more rigid and connected arms in the same configuration as in the saddle.

SUMMARY OF THE INVENTION

The invention overcomes the problem of uneven load distribution on a variable surface (the horse's back) by providing a direct load path from a concentrated downward force through a rigid structure having fulcrum edges that bear on a load bearing segmented interface that instantly morphs onto the supporting surface profile by tipping around the fulcrum to match the supporting surface shape. The rockrail edge is the fulcrum for the hingedly connected multiple rigid arms, which can tip up and down.

It is an object of this invention to provide a saddle for use on the back of a horse whereby localized load pressure points are eliminated, and whereby load is distributed more evenly over the entire footprint with the saddle.

It is a further object of this invention to provide a saddle pad for use with a conventional saddle on the back of a horse whereby peak loads from a rider are reduced, and whereby load is distributed more evenly over an enlarged contact area with the horse.

The invention is composed of two main component parts: a rockrail edge and a series of load bearing arms that use the rockrail as a fulcrum, to teeter-totter as the horse moves, instantly morphing the interface to match the horse's back.

It is an object of this invention to create a saddle that instantly reshapes to fit the horse's back without the effort or expertise of a saddle fitter.

DETAILED DESCRIPTION OF THE PREFERRED EMBODIMENTS

The following detailed description and accompanying drawings are provided for purposes of illustrating and describing presently preferred embodiments of the present invention and are not intended to limit the scope of the invention in anyway.

A saddle [1] is shown where at an interface with a horse [5], a rockrail edge [2] serves as a fulcrum for multiple hingedly connected [3], rigid load bearing arms [4], that can teeter-totter as the horse moves. Each rigid load bearing arm moves independently from the other rigid load bearing arm, allowing the combination of rockrail edge and hingedly connected load bearing arms to form a structure which reshapes or morphs to match a surface of the horse's back when moving. By morphing to the surface of the horse's back, the rider's weight is evenly distributed, reducing pressure points.

Figure 2:
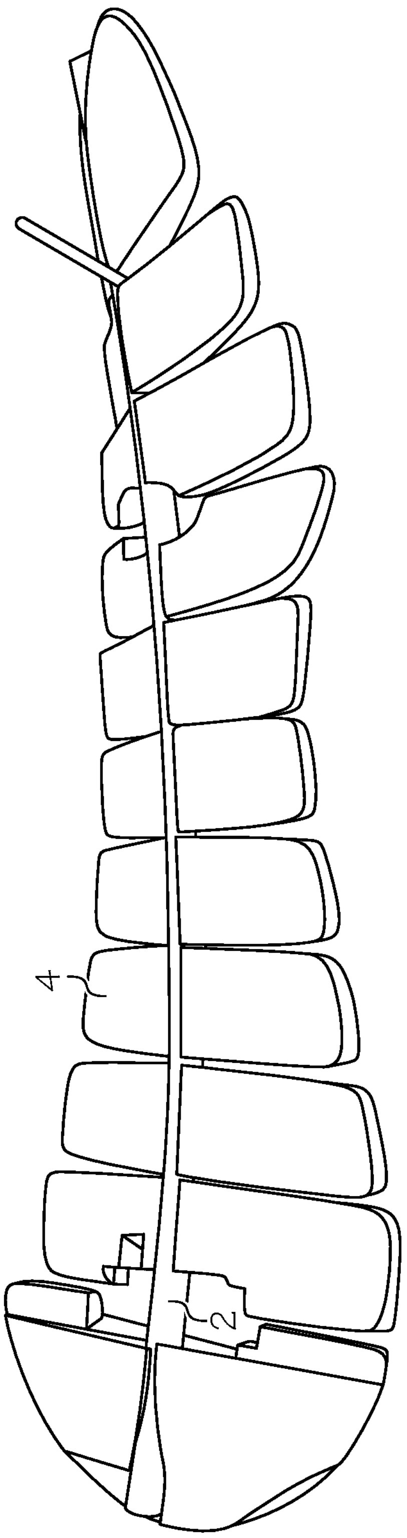
FIG. 2 is a prospective view of the two components, a rockrail edge portrayed as a tube in this embodiment, with a series of hingedly connected rigid, load bearing arms.

FIG. 2 shows the rockrail edge [2] and the multiple hingedly connected, rigid load bearing arms [4].

The application presents a saddle consisting of: a chassis with one or more rockrail edges, and one or more hingedly connected arms, wherein the arms are positioned underneath the rockrail edges to distribute the weight of a rider sitting in the chassis more evenly along an entire surface area of the chassis; the arms are assembled in parallel and abutting one another on each arm's longer edges; the arms provide a passively morphing profile that has the ability to reshape to match a horse's back in motion; and, wherein the arms are assembled from rigid support materials that are held in planar relation to one another when static, but when contact from the horse's back is made with the arms during the horse's motion, each arm can be caused to tip out of plane and seesaw about the rockrail edge, independent of its neighbor.

The rigid load bearing arms in the saddle can consist of rods, tubes, fingers or plates of various shapes and orientations and numbers, and can be fabricated from different materials including composites, metal, wood or plastic of sufficient rigidity. The arms can be held in planar relation to each other by a variety of methods including encasement, pinning along midline area, nesting in flexible materials, injection molding an assembly, attaching to an axle, or even partially cut from a whole sheet.

Figure 3:
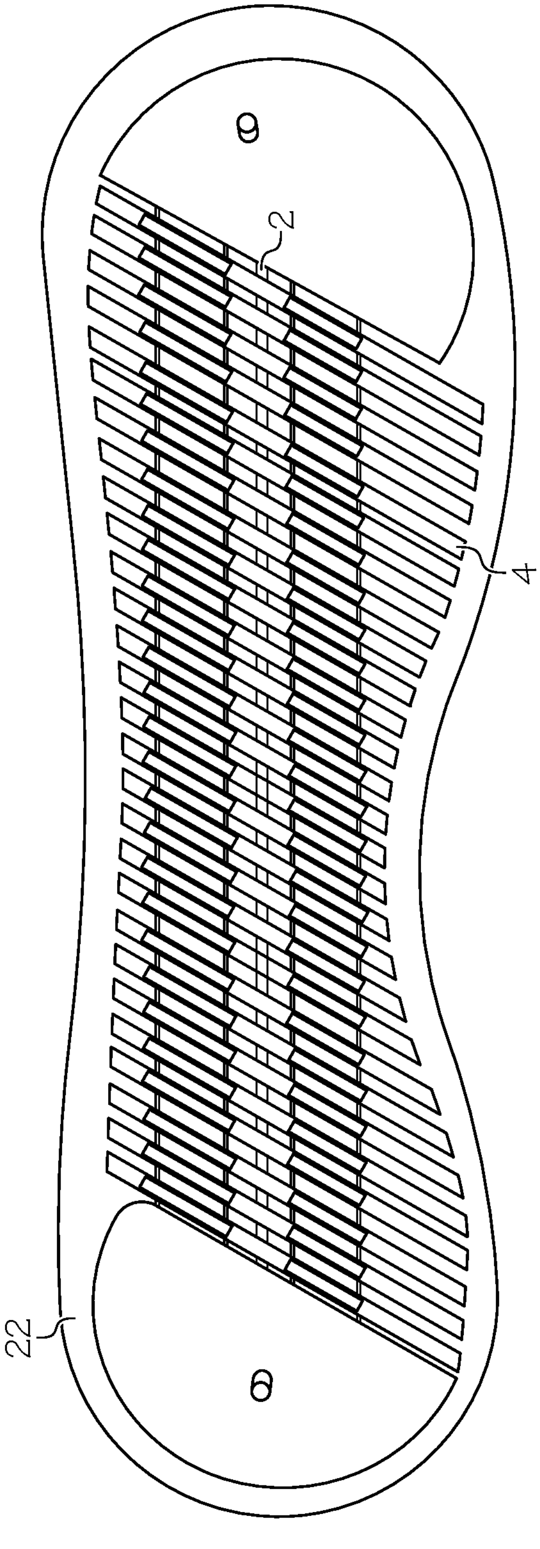
FIG. 3 is a plan view of a series of connected rigid, load bearing arms with high points as a fulcrum so as to teeter totter under the bars of a conventional saddle as the horse moves, instantly morphing the interface with the horses back, to be inserted in a saddle pad.

FIG. 3 shows an insert for a saddle pad [22], with load bearing arms [4] aligned side by side. Each rigid, load bearing arm [4] tips independently from the other rigid load bearing arms, about a high point as a fulcrum [2], allowing the assembly of connected load bearing arms [4] to form a structure which morphs to match a surface of the horse's back with movement. By morphing to the surface of the horse's back, the saddle footprint is enlarged and thereby peak pressures are reduced.

Figure 4:
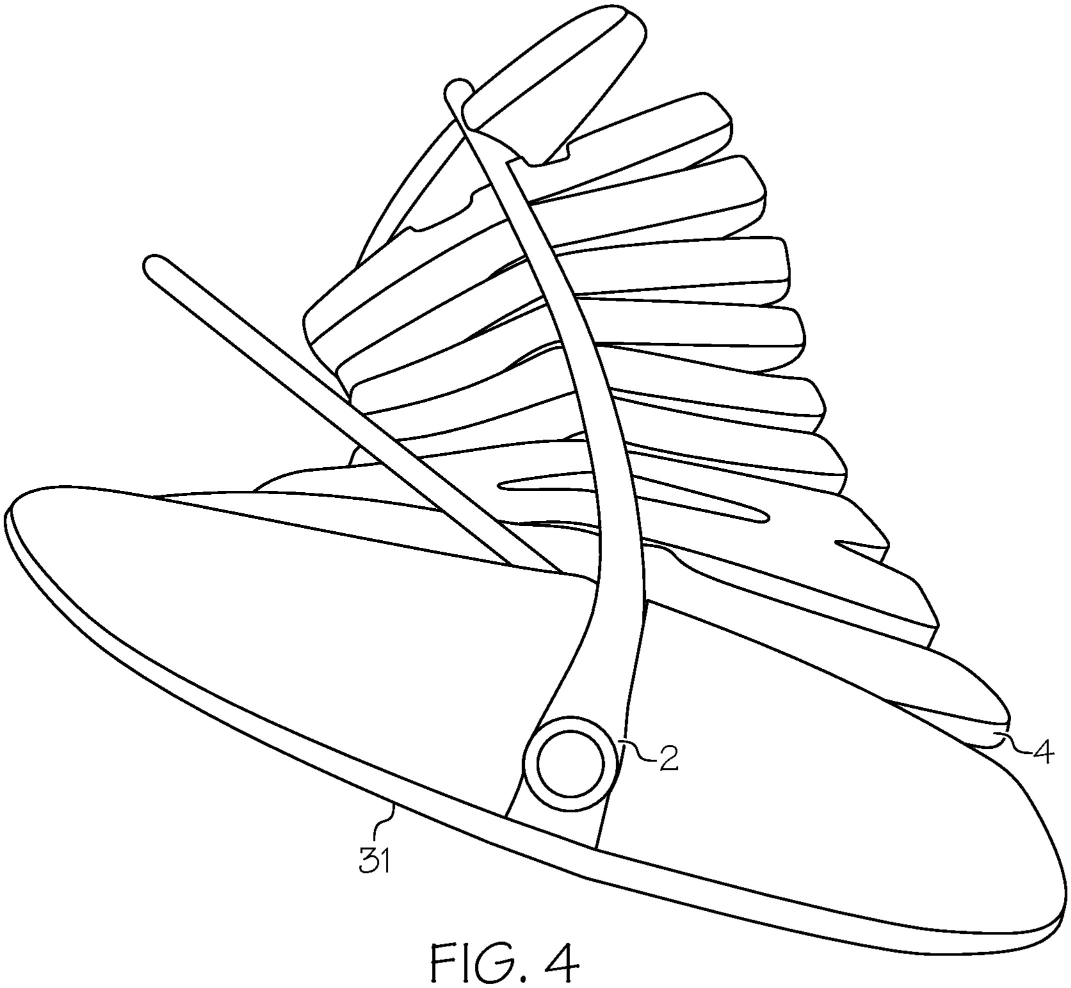
FIG. 4 is a view from one end of the two components, a rockrail edge portrayed as a tube in this embodiment with a series of hingedly connected rigid, load bearing arms, and showing that the arms are constrained in all directions except for pivoting on the rockrail edge tube.
Figure 6:
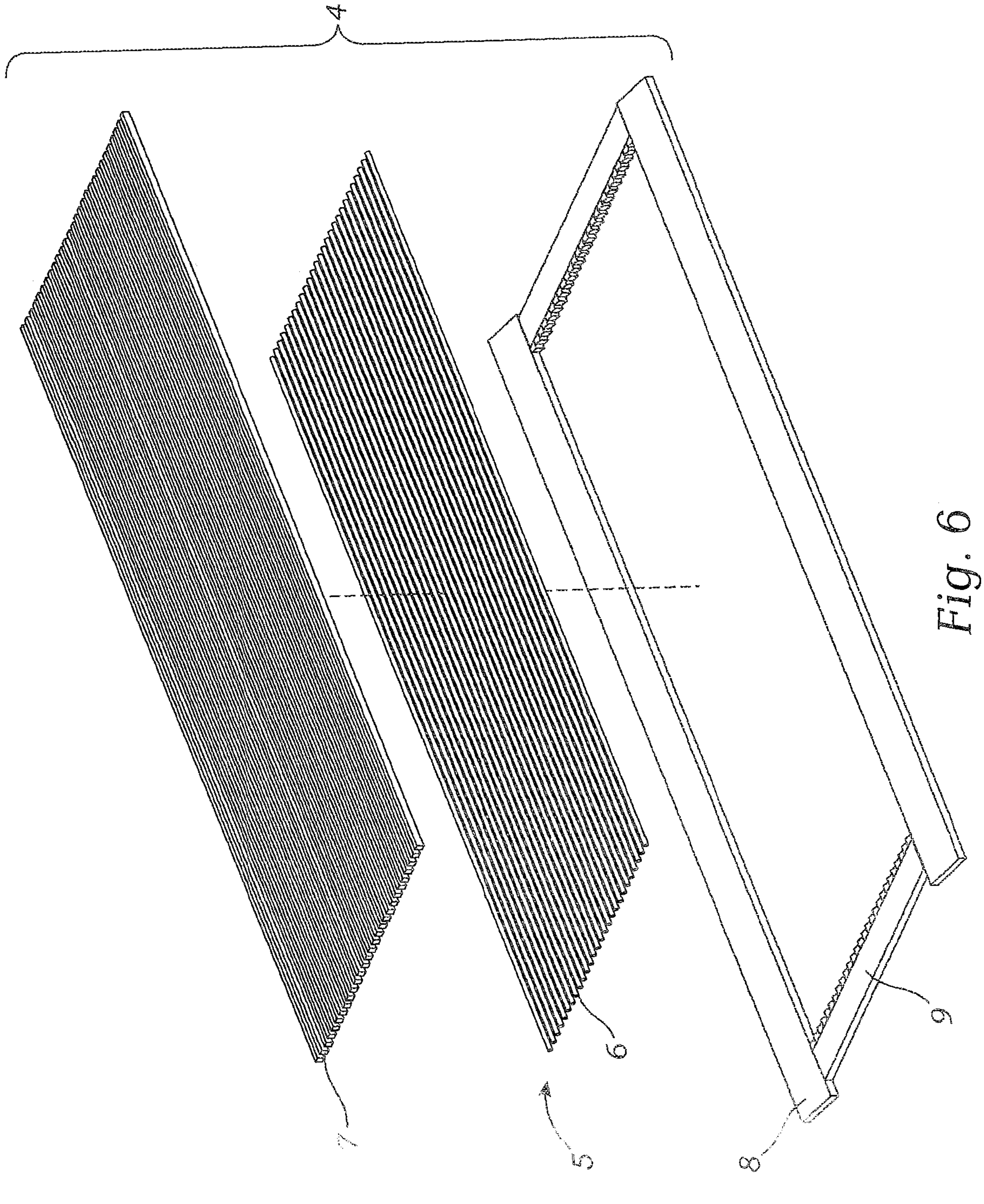
FIG. 6 is the preferred embodiment of the interface [4] showing an exploded view of elements [5] made of rigid material [6] such as carbon fiber tubes, where foam spacers [7] are positioned between each element [5], end caps [9], and side walls [10].
Figure 7:
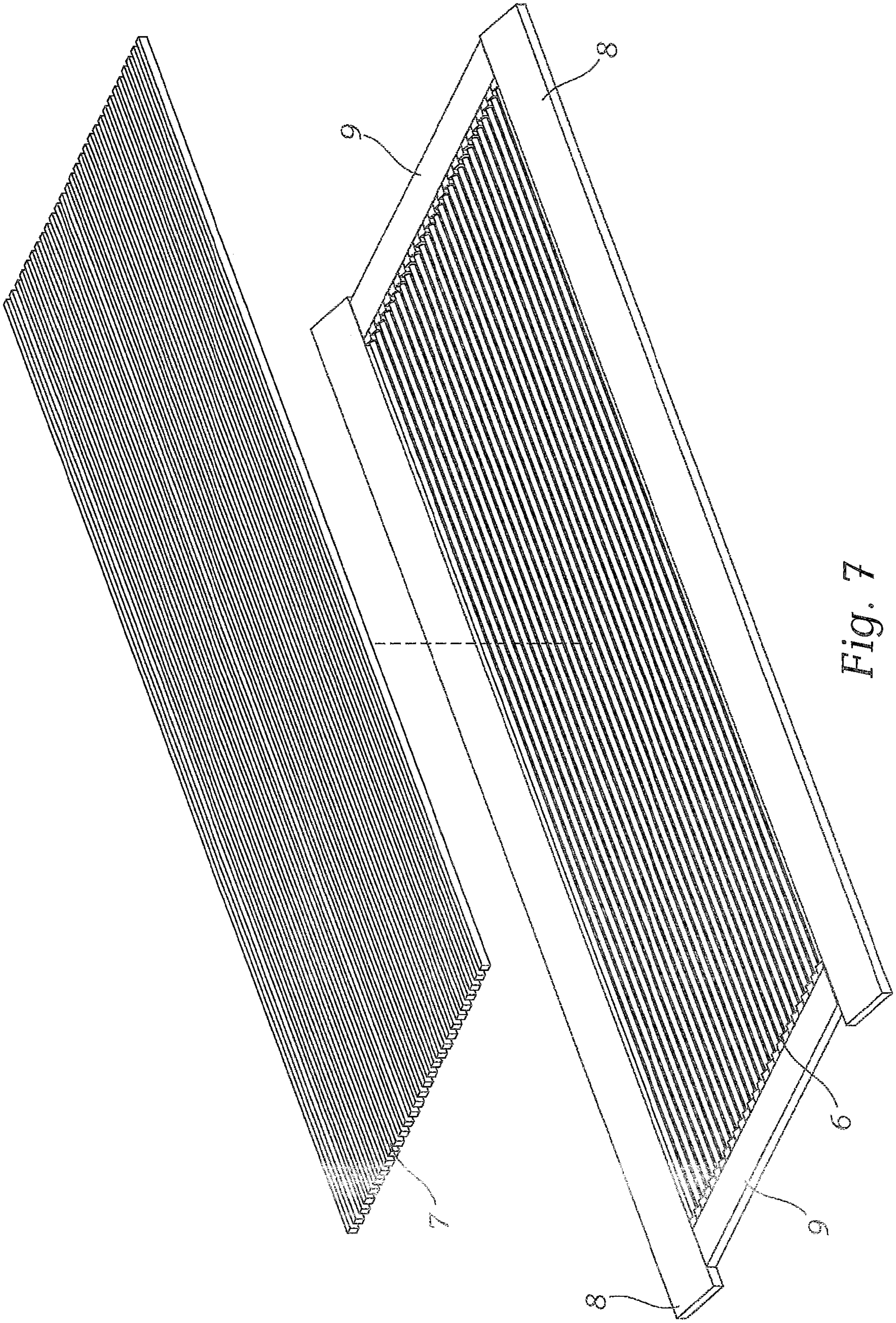
FIG. 7 is the preferred embodiment of the interface showing a partial exploded view of elements made of rigid materials [6], wherein the rigid materials [6] are angled to allow for passive morphing that reshapes and twists to match the support surface and wherein the rigid materials [6] are placed between the end caps [9] and side walls [8] with the foam inserts [7] shown above that are positioned between each of the elements.
Figure 8:
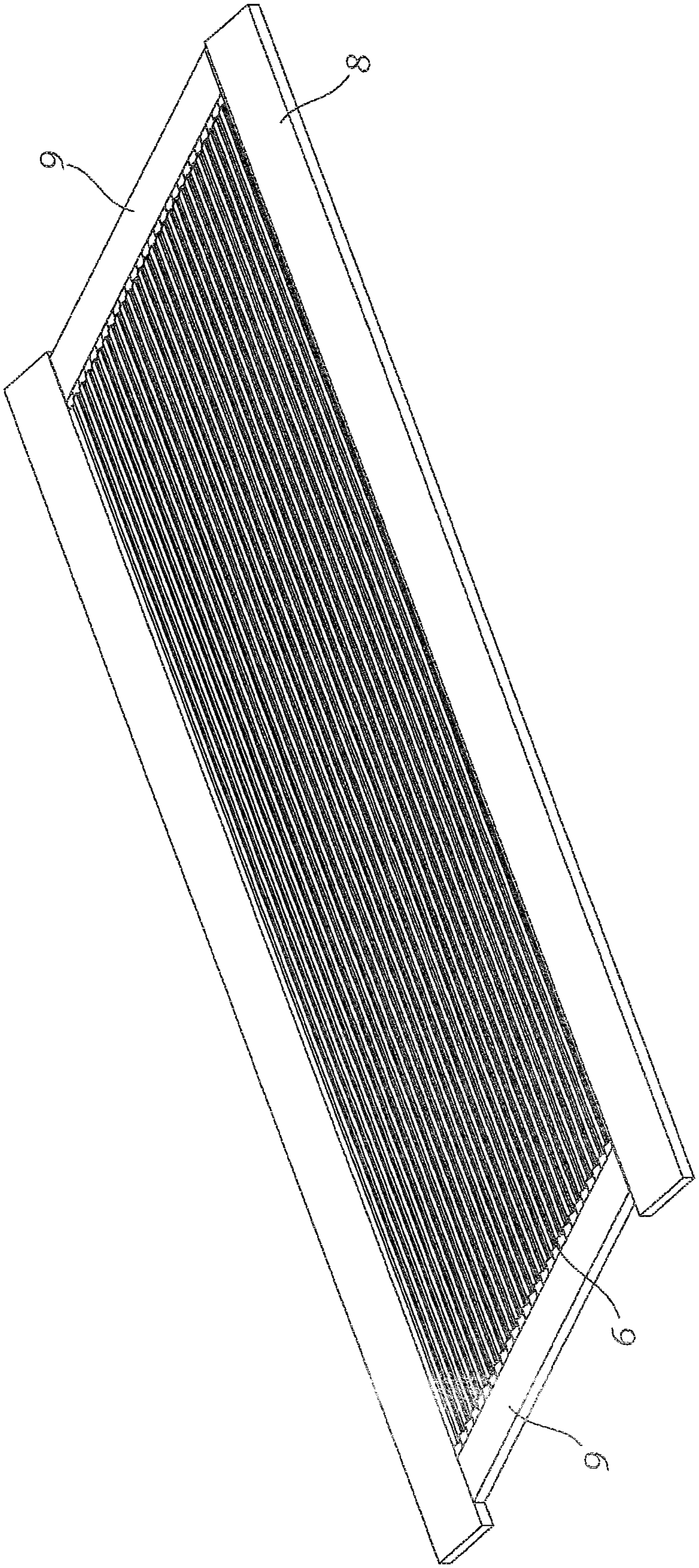
FIG. 8 is a perspective view of the preferred embodiment showing the interface comprised of one or more elements, foam spacers, end caps, and side walls.
Figure 9:
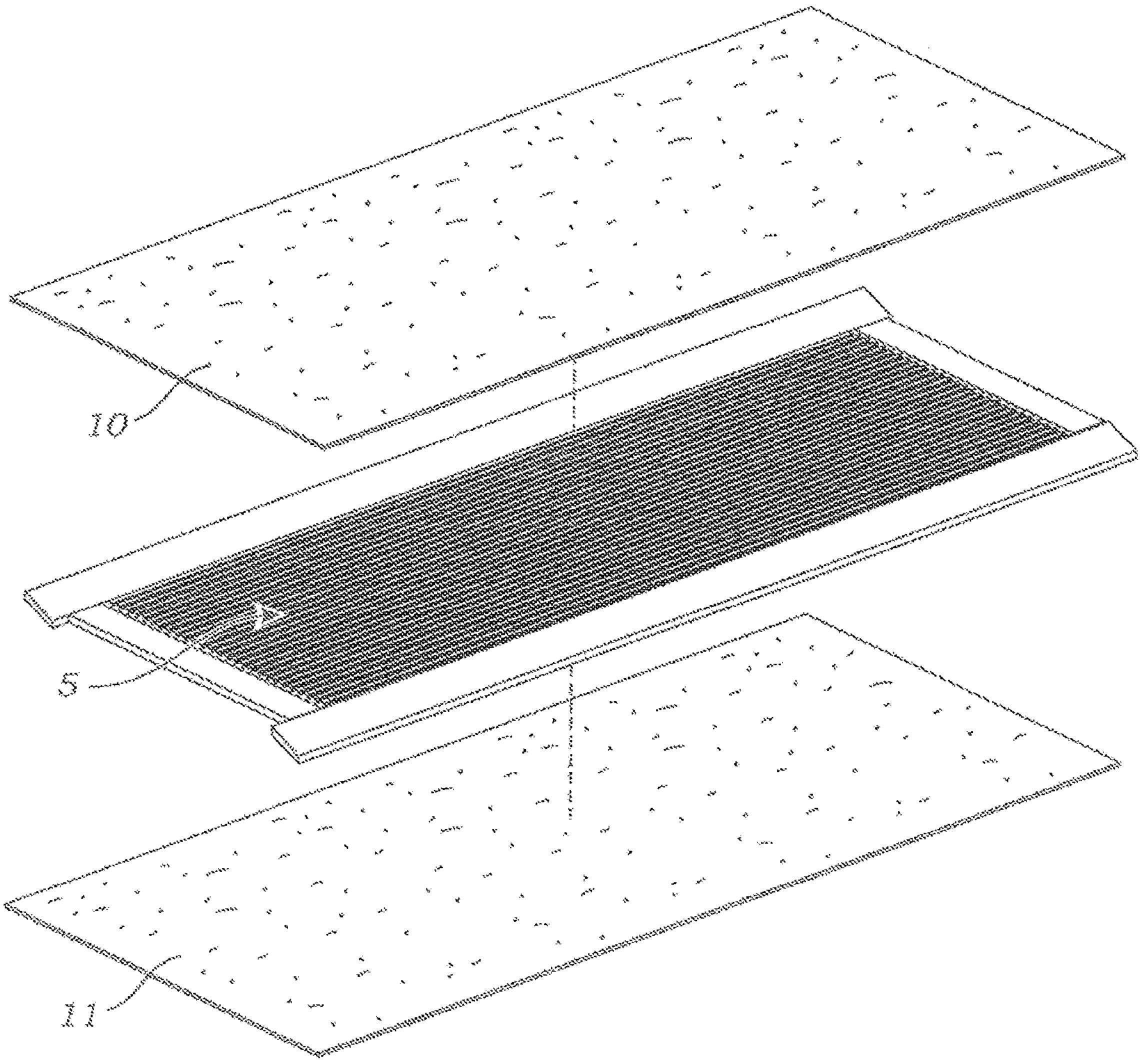
FIG. 9 is an exploded view showing top foam sheet [10] and bottom foam sheet [11] that is sandwiched between the panel showing the elongated carbon fiber support tubes, foam spacers, end caps, and side walls.
Figure 10:
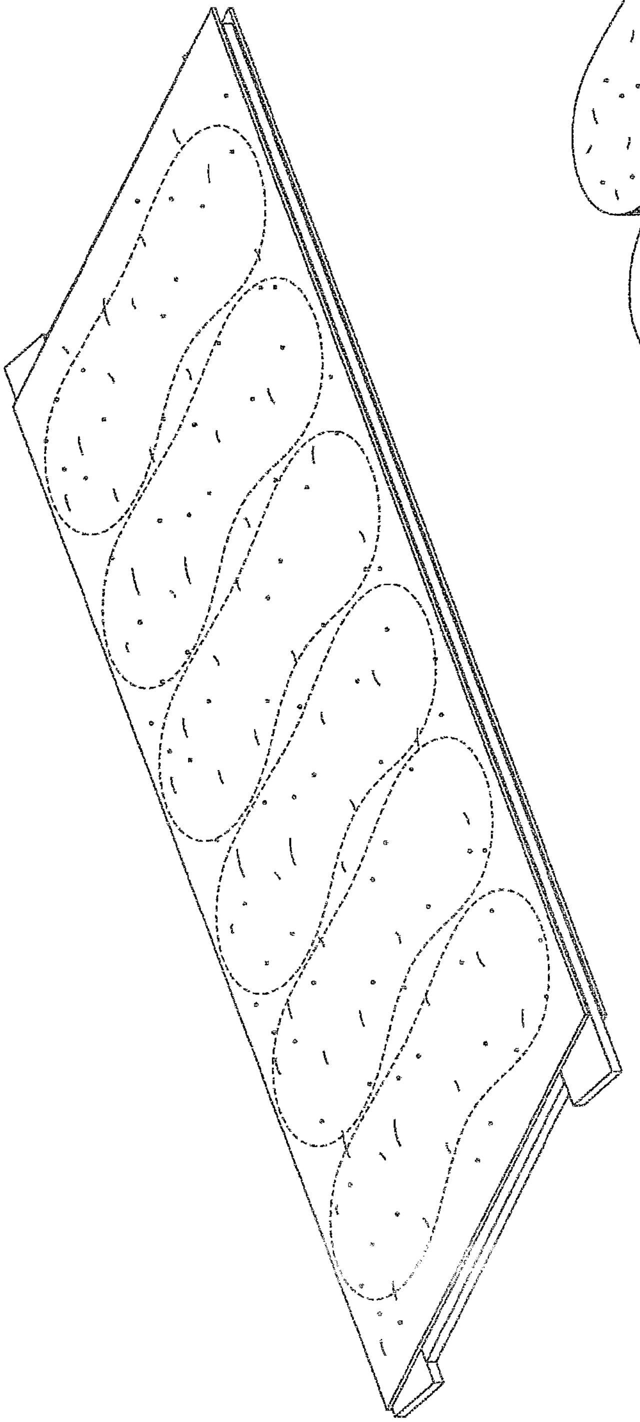
FIG. 10 is a perspective view showing the top and bottom foam sheet that are sandwiched between the panel showing the elongated carbon giver support tubes, foam spacers, end caps, and side walls, wherein the interface is stamped out.
Figure 11:
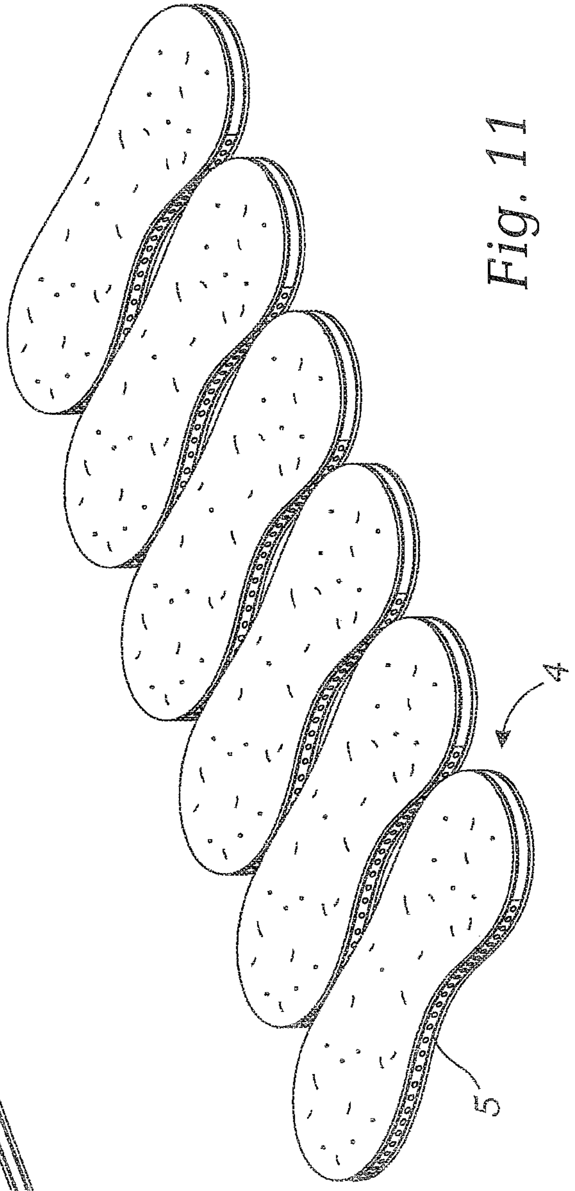
FIG. 11 is a perspective view of the interface stamped out of the mold.
Figure 12:
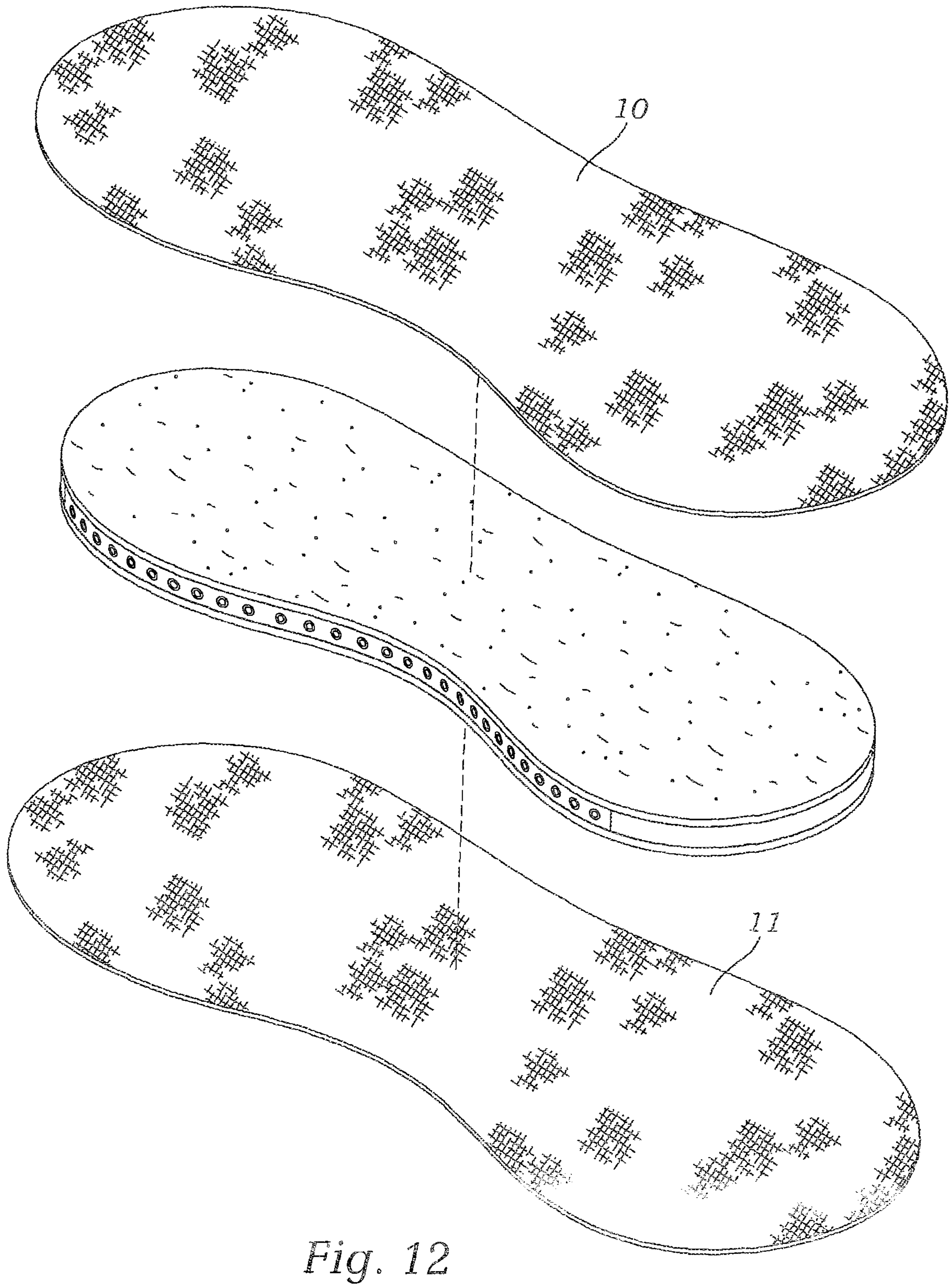
FIG. 12 is a perspective view showing an additional optional top foam sheet [10] and bottom foam sheet [11] that are sandwiched between the interfaces after the interface has been stamped out.
Figure 13:
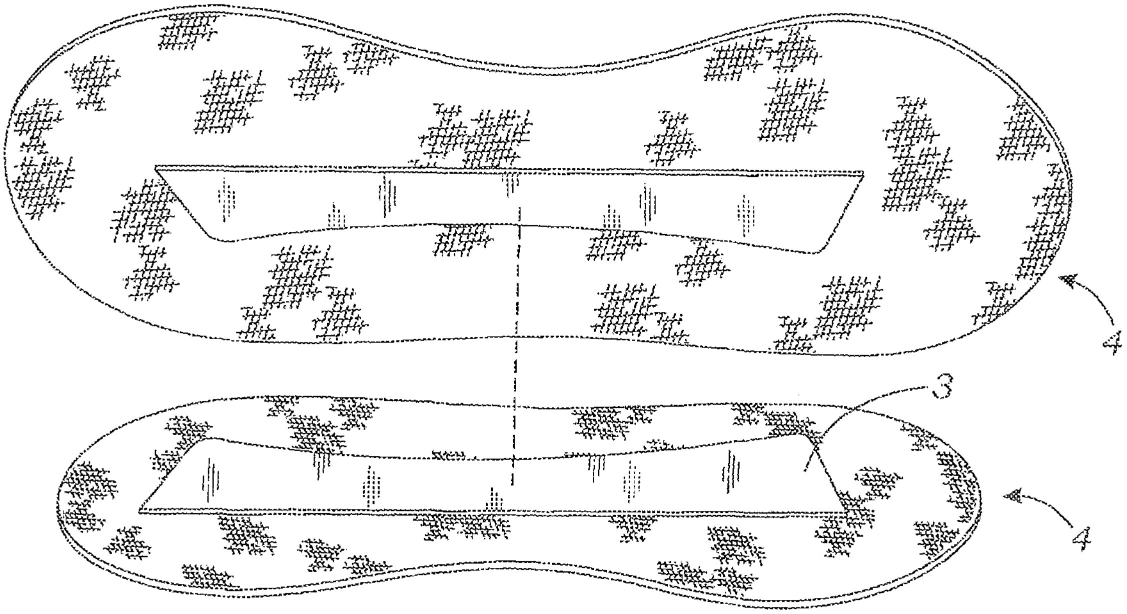
FIG. 13 is a perspective view of the two interfaces having one or more elements showing the midline of the bars.
Figure 14:
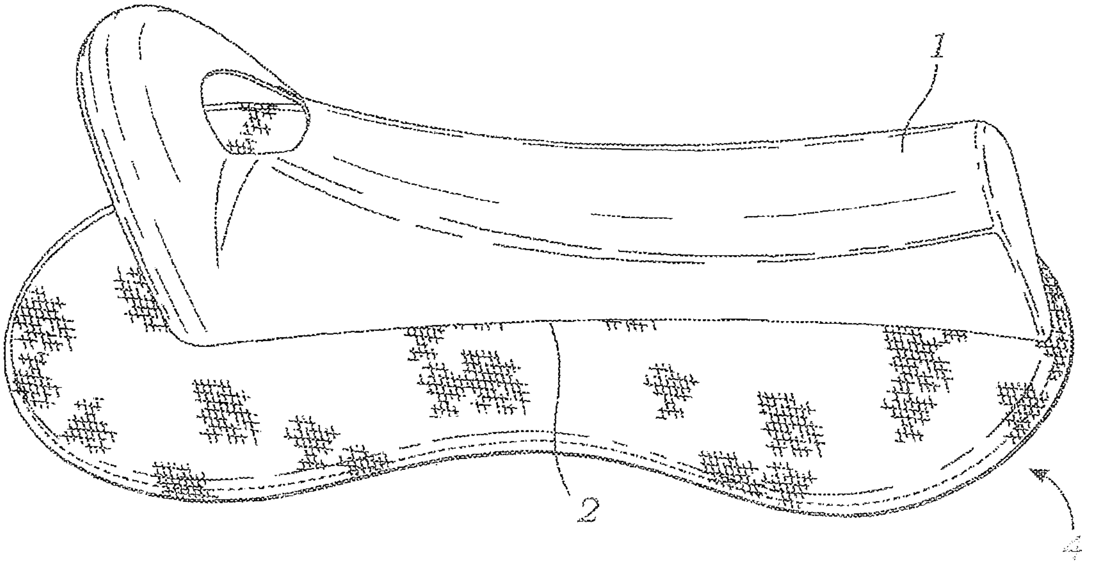
FIG. 14 is a perspective view of the saddle seat with two interfaces having one or more segmented bars positioned underneath said seat.

The rigid load bearing arms [4] in FIG. 4 are constructed from one or more elements having elongated support members that are positioned between one or more foam spacers, end caps, and side walls as shown in FIG. 6.

Further an underside of the saddle has a top foam sheet and a bottom foam sheet that are sandwiched between one or more rigid load bearing arms having said elongated support members that are positioned between one or more foam spacers, end caps, and side walls. Wherein the saddle is connected to the rockrail edge on each side of the horse.

The application presents a saddle pad to be placed under a conventional saddle consisting of: a cushioned material in a rectangular shape which can be placed on a horse's back; a rockrail edge on each downward side of the saddle pad, running the length of the saddle pad, and which is sewn into the cushioned material; a series of arms are hingedly connected to the rockrail edge, which serves as a fulcrum, so that the arms are parallel to and abut one another, and can move independently from one another; the arms are assembled from rigid materials that are held in planar relation to one another when static, but when contact from the saddle pad is made with each arm then each arm can be caused to tip out of plane and seesaw about the rockrail edge, and wherein as the horse moves the arms provide a passively morphing profile to match the varying supporting surfaces of the horse's back.

The rigid load bearing arms in a saddle pad which is designed to fit under a conventional saddle, can consist of rods, tubes, fingers or plates of various shapes and orientations and numbers, and can be fabricated from different materials including composites, metal, wood or plastic of sufficient rigidity. The arms can be held in planar relation to each other by a variety of methods including encasement, pinning along midline area, nesting in flexible materials, injection molding an assembly, attached to an axle, or even partially cut from a whole sheet.

The arms are constructed from rigid support materials having support members that are positioned between one or more foam spacers, end caps, and side walls.

Further the interface on the underside of the saddle has a top sheet and a bottom sheet that are sandwiched around the rigid support materials having said support members that are positioned between one or more foam spacers and side walls.

Figure 1:
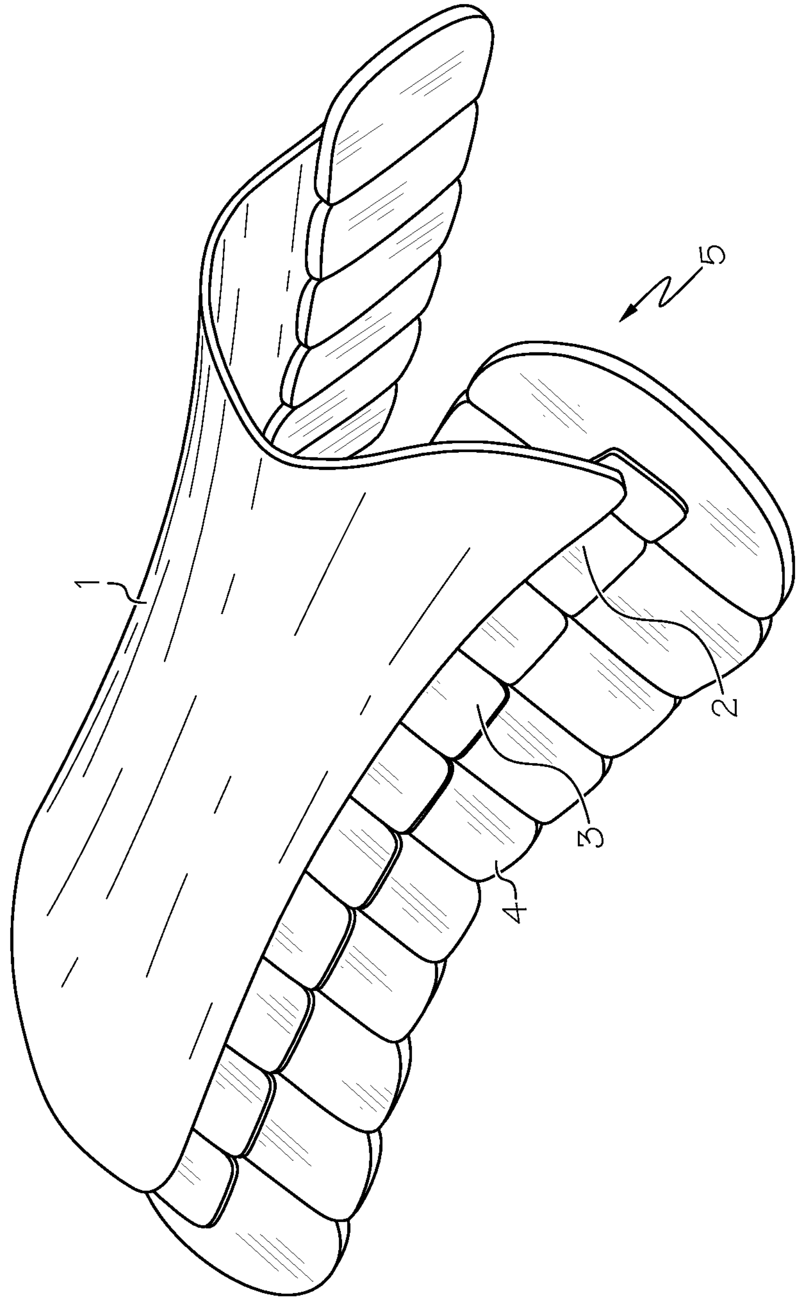
FIG. 1 is a prospective view of a simplified drawing of the saddle, displaying two components: a rockrail edge and a series of hingedly connected rigid, load bearing arms that use the rockrail edge as a fulcrum, to teeter-totter as the horse moves, instantly morphing the interface with the horse's back.

The rockrail edge [2] in FIG. 1, can be created within the saddle by various means, including machining into a stiff chassis, meaning the frame which is integrated into the saddle [1]. The multiple rigid load bearing arms [4] can be connected to the saddle [1] by means of a press fit, molded to the rockrail edge, ball and socket, or hinges of various types.

The saddle is selected from the group consisting of chassis, equine saddle, saddle tree, treeless saddle, Australian saddle, English saddle, or western saddle.

The arms [4] in FIG. 3, can be held in place in the saddle pad by various means, including sewn in place.

In FIG. 4, the rockrail edge [2] and the multiple hingedly connected rigid, load bearing arms [4] form a structure which can morph to match the horse's back in motion. The arms are not flexible, and are constrained in all directions except pivoting on the rockrail edge [2].

Figure 5:
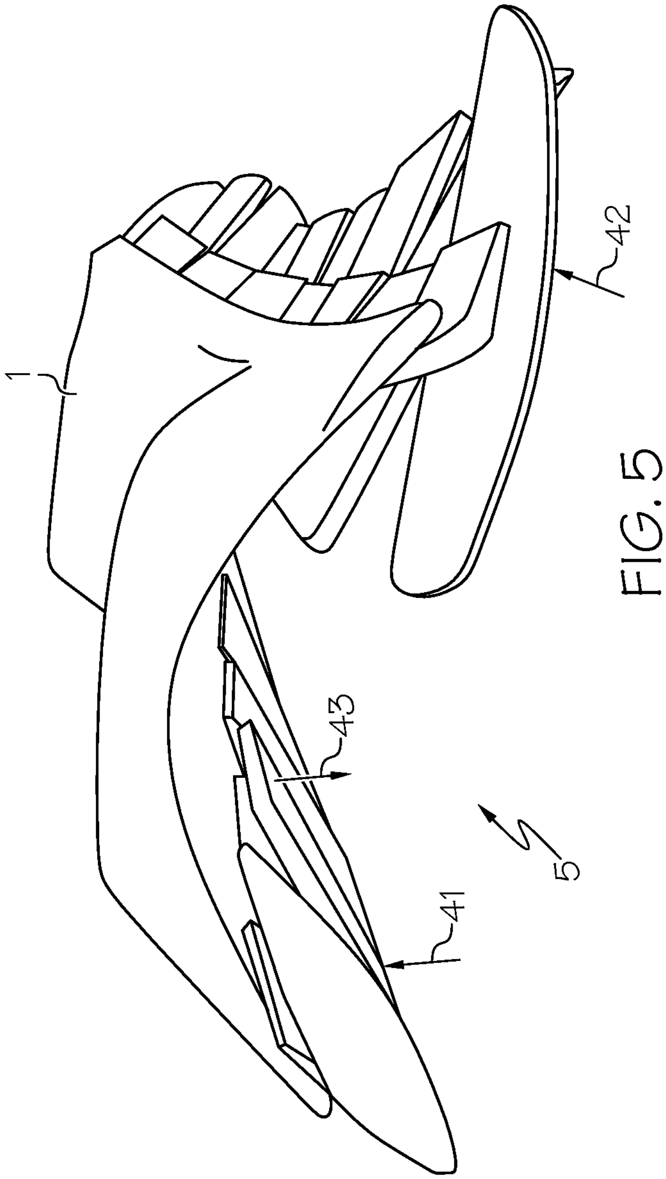
FIG. 5 is a rear orthographic view of a saddle, showing how the downward force from the rider's weight distributed along the rockrail edge to a single arm, and the counterbalancing upward force from the horse.

FIG. 5 shows the various forces acting on the saddle [1] due to the shifting weight of the rider as the horse [5] moves. There are downward forces [43] from the weight of the rider and upward forces from the horse in motion [41 and 42], to counteract the downward forces.

I claim:

1. A saddle consisting of:

a chassis with one or more rockrail edges, and one or more hingedly connected arms, wherein the arms are positioned underneath the rockrail edges to distribute the weight of a rider sitting in the chassis more evenly along an entire surface area of the chassis;

the arms are assembled in parallel and abutting one another;

the arms provide a passively morphing profile that has the ability to reshape to match a horse's back in motion; and, the arms are assembled from rigid support materials having support members that are positioned between one or more foam spacers, end caps, and side walls, that are held in planar relation to one another when static, but when contact from the horse's back is made with the arms during the horse's motion, each arm can be caused to tip out of plane and seesaw about the rockrail edge, independent of its neighbor.

2. The saddle according to claim 1, further consisting of a top sheet and a bottom sheet that are sandwiched around the rigid support materials having said support members that are positioned between one or more foam spacers, end caps, and side walls.

* * * * *